(12) United States Patent
Lin et al.

(10) Patent No.: US 11,645,032 B1
(45) Date of Patent: May 9, 2023

(54) SMART MULTI-SCREEN WALL ARRANGEMENT IN A VIRTUAL REALITY ENVIRONMENT

(71) Applicant: International Business Machines Corporation, Armonk, NY (US)

(72) Inventors: June-Ray Lin, Taipei (TW); Li Na Wang, Beijing (CN); Ju Ling Liu, Beijing (CN); Ye Chuan Wang, Beijing (CN); Nan Chen, Beijing (CN); Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/932,020

(22) Filed: Sep. 14, 2022

(51) Int. Cl.
  *G06F 3/14*  (2006.01)
  *G06F 3/04815*  (2022.01)

(52) U.S. Cl.
  CPC ........ *G06F 3/1446* (2013.01); *G06F 3/04815* (2013.01)

(58) Field of Classification Search
  CPC .......................... G06F 3/1446; G06F 3/04815
  See application file for complete search history.

(56) References Cited

U.S. PATENT DOCUMENTS

| | | | |
|---|---|---|---|
| 5,923,307 A | 7/1999 | Hogle, IV | |
| 5,950,202 A | 9/1999 | Durward et al. | |
| 9,684,380 B2 * | 6/2017 | Kramer | G06V 40/107 |
| 9,792,567 B2 * | 10/2017 | Khasis | G08G 1/20 |
| 11,314,325 B2 | 4/2022 | Young et al. | |
| 11,354,848 B1 | 6/2022 | Surti et al. | |
| 2005/0021472 A1 * | 1/2005 | Gettman | G06Q 40/04 705/52 |
| 2015/0215497 A1 * | 7/2015 | Zhang | H04N 21/6336 348/521 |
| 2021/0166537 A1 * | 6/2021 | Balasubramanian | G08B 13/19645 |

FOREIGN PATENT DOCUMENTS

| | | |
|---|---|---|
| WO | 2021226411 A1 | 11/2021 |
| WO | 2021242049 A1 | 12/2021 |
| WO | 2022108652 A1 | 5/2022 |

\* cited by examiner

*Primary Examiner* — Jonathan A Boyd
(74) *Attorney, Agent, or Firm* — Cantor Colburn LLP; Kelsey M. Skodje

(57) ABSTRACT

Embodiments of the invention are directed to a computer-implemented method of operating a multi-screen virtual reality environment. The computer-implemented method includes performing a wall arrangement and transmission (WA&T) protocol that includes receiving at a second module a function transmitted by a first module over a network to the second module. The second module and the function received over the network are used to generate priority data that identifies a priority of each of a plurality of individual video streams generated by a plurality of video sources. Based at least in part on the priority, the second module is used to generate reduced-size video streams that include selected ones of the plurality of individual video streams. The second module transmits the priority data and a multi-screen video stream that includes the reduced-size video streams and non-reduced-size video streams of the plurality of individual video streams.

20 Claims, 12 Drawing Sheets

SMART MULTI-SCREEN WALL ARRANGEMENT IN A VIRTUAL REALITY ENVIRONMENT

BACKGROUND

The present invention relates in general to programmable computer systems operable to implement virtual reality environments. More specifically, the present invention relates to computing systems, computer-implemented methods, and computer program products operable to implement a smart multi-screen (or multi-monitor) wall arrangement in a virtual reality (VR) environment, which can include internet-based three-dimensional (3-D) or virtually integrated environments known as "metaverse" environments.

360-degree videos, also known as immersive videos or spherical videos, are video recordings where a view in every direction is recorded at the same time using, for example, an omnidirectional camera or a collection of cameras. An immersive 360-degree video system can be implemented as a computer system operable to generate and display immersive 360-degree video images that simulate a real world experience. A person can enter and leave the simulated real world experience at any time using technology. The basic components of a 360-degree video system includes a display; a computing system; and various feedback components that provide inputs from the user to the computing system. In some implementations, the display can be integrated within a head-mounted device (HMD) worn by the user and configured to deliver sensory impressions to the human senses (sight, sound, touch, smell, and the like) that mimic the sensory impressions that would be delivered to the human senses by the corresponding actual environment being displayed through the video. The type and the quality of these sensory impressions determine the level of immersion and the feeling of presence in the 360-degree video system. Other outputs provided by the HMD can include audio output and/or haptic feedback. The user can further interact with the HMD by providing inputs for processing by one or more components of the HMD. For example, the user can provide tactile inputs, voice commands, and other inputs while the HMD is mounted to the user's head.

The term "metaverse" describes a variety of VR environments, including highly immersive internet-based 3-D or virtually integrated environments. A metaverse environment can also be described as an online "place" where physical, virtual and augmented realities are shared. In an example implementation, expensive and complicated security operations centers (SOCs) in video-monitored security systems can, in theory, be replaced with a VR display (e.g., an HMD) in a metaverse environment. The individual physical monitors in an SOC could potentially be replaced with a virtual wall of monitors (or a multi-screen wall) in a metaverse environment driven by software. Thus, a metaverse SOC opens the possibility of making an infinite number of monitors (or screens) available inside VR HMD. In addition to saving the hardware costs of building the SOC, a metaverse SOC implementation could, if practically implemented, save on power, space utilization, rent, and the ability to retain employees. VR headsets could further enhance the experience of an SOC by incorporating 3D graphics (e.g., augmented reality), customizable dashboards, and other elements. The operators of a metaverse SOC would not need to be in the same room if they are in the same "virtual space," thus enabling them to collaborate even more effectively. The ability to virtually "travel" to various "places" in the metaverse could enable an operator to virtually visit any number of remote physical locations and interface efficiently with the systems at the remote physical locations. Other example implementations of a multi-screen metaverse environment include information technology (IT) service monitoring and conducting software user interface (UI) question and answer (Q&A) sessions.

Despite the potential benefits of implementing multi-screen systems in a metaverse environment, there are challenges to realizing the benefits of metaverse multi-screen environments. For example, the ability to transmit videos/images of an infinite number of screens/monitors from their corresponding servers and devices through a transmission network is bounded by the network's bandwidth limitations. Data compression technology cannot solve the bandwidth problem because even if the data from every server and device can be compressed to fit the network bandwidth limits, known HMDs do not have the computing power to perform the required decompression operations. Additionally, both stand-alone displays and displays that are integrated within an HMD are typically smaller than the full 360-degree video frame, so only a portion of the full 360-degree video frame is displayed at one time. The user's FOV (field-of-view) is typically smaller than the display, so the user is only able to focus on the portion of the display that is within the user's FOV.

SUMMARY

Embodiments of the invention are directed to a computer-implemented method of operating a multi-screen VR environment. The computer-implemented method includes performing a wall arrangement and transmission (WA&T) protocol that includes receiving at a second module a function transmitted by a first module over a network to the second module. The second module and the function received over the network are used to generate priority data that identifies a priority of each of a plurality of individual video streams generated by a plurality of video sources. Based at least in part on the priority, the second module is used to generate reduced-size video streams that include selected ones of the plurality of individual video streams. The second module transmits the priority data and a multi-screen video stream that includes the reduced-size video streams and non-reduced-size video streams of the plurality of individual video streams.

The above-described computer-implemented method provides improvements over known methods of rendering a multi-screen VR environment by employing a division of labor between the first module and the second module when implementing the WA&T protocol. Operations of the WA&T protocol having relatively lower computational requirements (e.g., storing and transmitting the function) are assigned to the first module; and operations of the WA&T protocol having relatively higher computational requirements (based on the function, determining the priority data. Thus, embodiments of the invention remove the computing functionality that can be provided at the first module (e.g., at the HMD) as a limiting factor in implementing a multi-screen wall arrangement having the potential to access and control an unlimited number of screens.

In addition to one or more of the features described above, or as an alternative to any of the foregoing embodiments, the first module is operable to, responsive to receiving the priority data, generate a video screen arrangement from the multi-screen video stream, and display the video screen arrangement on a user display. In addition to one or more of the features described above, or as an alternative to any of the foregoing embodiments, the video screen arrangement includes a central region of the display and peripheral regions of the display. The central region is displayed at a first resolution; and each of the peripheral regions is displayed at a reduced resolution that is less than the first resolution and based on a distance from the central region to one of the peripheral regions associated with the reduced resolution.

The above-described computer-implemented method provides improvements over known methods of rendering a multi-screen VR environment by providing the WA&T protocol's with the ability to automatically and repeatedly configure a relatively larger high resolution central display region and relatively smaller low resolution peripheral display regions to leverage the fact that, for both stand-alone displays and displays that are integrated within the HMD, only a portion of the full 360-degree video frame is displayed at one time.

The use of priority computations to create reduced data-level video stream transmissions coming into the first module (e.g., coming into the HMD) addresses the bandwidth constraints that prevent transmitting the large amount of data that would be required to present all regions of the HMD (or the NHMD) at full video resolution. Streaming data transmissions are controlled using the WA&T protocol such that the streaming data does not exceed the transmission network's bandwidth capabilities, which reduces or eliminates streaming delay and/or resolution degradation that reduce the end user's QoE.

In addition to one or more of the features described above, or as an alternative to any of the foregoing embodiments, the first module is operable to make a determination that a user is devoting user attention to a first one of the peripheral regions. The WA&T protocol further includes, based at least in part on the determination, using the second module to adjust a reduced resolution of the first one of the peripheral regions.

The above-described computer-implemented method provides improvements over known methods of rendering a multi-screen VR environment by providing the user-attention-based adjustment functionality of the WA&T protocol such that it enables the low or reduced video/image resolution in peripheral display regions to be increased automatically based on the level of attention the user pays to a given peripheral display region.

In addition to one or more of the features described above, or as an alternative to any of the foregoing embodiments, the WA&T protocol further includes using the second module to generate updated priority data. Based at least in part on the updated priority data, the second module is used to generate updated reduced-size video streams that include updated selected ones of the plurality of individual video streams. The second module is used to transmit the updated priority data and an updated multi-screen video stream. The updated multi-screen video stream includes updated reduced-size video streams and updated non-reduced-size video streams of the plurality of individual video streams. The first module is operable to, responsive receiving the updated priority data, generate an updated video screen arrangement from the updated multi-screen video stream.

The above-described computer-implemented method provides improvements over known methods of rendering a multi-screen VR environment by automatically updating the priority determinations and so that the wall arrangement can be automatically updated if and when the priorities change.

Embodiments of the invention are also directed to computer systems and computer program products having substantially the same features and technical improvements as the computer-implemented method described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
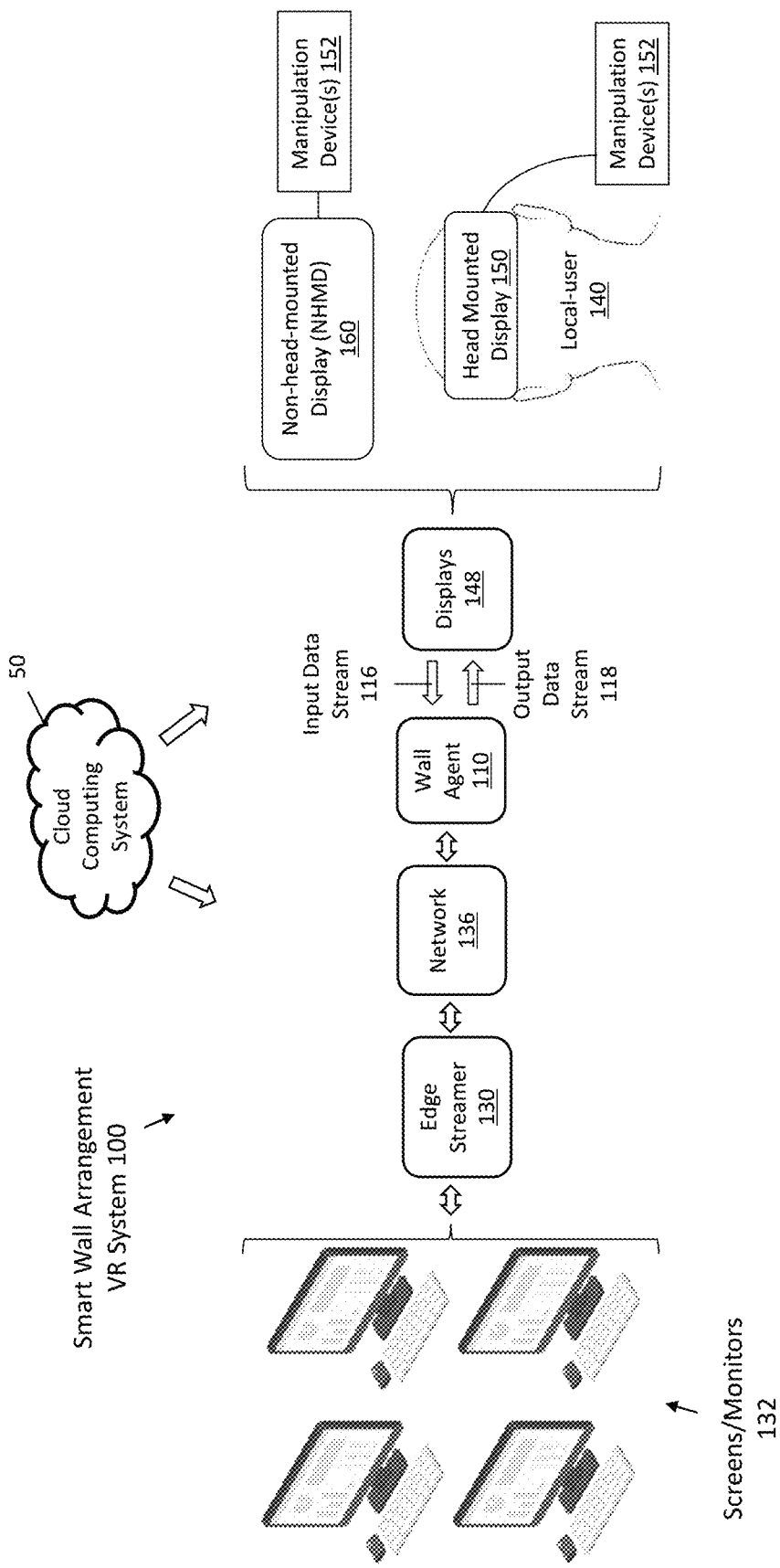
FIG. 1 depicts a block diagram illustrating a system according to embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

Turning now to an overview of technologies that are relevant to aspects of the invention, as previously noted herein, metaverse environments open the possibility of making an infinite number of screens or monitors available inside a VR HMD, which means an infinite number of virtual monitors can, in theory, be accessed through a given metaverse space. However, it is a challenge to receive images/videos of the infinite number of monitors from the corresponding servers and devices that generated the images/videos because the data to be transmitted will be bounded by network bandwidth limitations. This is particularly true for video transmissions such as 4K VR and/or 360-degree video streaming. In general, streaming refers to any media content—live or recorded—delivered to computers and mobile devices via the internet and played back in real time. Podcasts, webcasts, movies, TV shows, and music videos are common forms of streaming content. Streaming content that exceeds the transmission network's bandwidth capabilities result in streaming delay and/or resolution degradation that reduce the end user's quality of experience (QoE). In general, QoE is a measure of the delight or annoyance a customer experiences when utilizing a service such as web browsing, phone calls, TV broadcasts, and the like. In metaverse environments, data compression technology cannot solve the bandwidth problem because even if the enormously large volume of data generated by the multiple screens/monitors can be compressed to fit the network bandwidth limits, known HMDs do not have the computing power to perform the required decompression operations. Additionally, both stand-alone displays and displays that are integrated within the HMD are typically smaller than the full 360-degree video frame, so only a portion of the full 360-degree video frame is displayed at one time. The user's FOV (field-of-view) is typically smaller than the display, so the user is only able to focus on the portion of the display that is within the user's FOV.

Turning now to an overview of aspects of the invention, embodiments of the invention provide computing systems, computer-implemented methods, and computer program products operable to implement a smart multi-screen (or multi-monitor) wall arrangement system in a highly immersive VR environment such as an internet-based 3-D or virtually integrated metaverse environment. In embodiments of the invention, the adjective "smart" describes the use of computer-based, networked technologies to augment the features of the multi-screen wall arrangement system in a VR or metaverse environment. The disclosed smart multi-screen wall arrangement system uses components, software, and connectivity to gather and analyze data about the multi-screen wall arrangement system to inform decision-making and perform operational control of the multi-screen wall arrangement system. In embodiments of the invention, the smart multi-screen wall arrangement system includes a wall agent module, an edge streamer module, and (optionally) a neural network module, which are operable to implement a smart multi-screen wall arrangement & transmission (WA&T) protocol.

In embodiments of the invention, the smart multi-screen WA&T protocol includes determining a priority of each of the available multi-screens; determining the total number of screens that will be on the display at one time (i.e., the "displayed-screens"); and automatically arranging the displayed-screens based on each displayed-screen's priority. In embodiments of the invention, each screen's priority is determined based on a level of attention the screen requires from the user or the viewer. In embodiments of the invention, the level of attention the screen requires from the user is based on the computation of an importance index for each of the screens. The screens that have the highest importance index are assigned the highest priorities and included among the displayed-screens, and the displayed-screen(s) with the highest priority is displayed at full video/image resolution within an expected line of sight (or point of view) of the user. The remaining displayed-screens are placed on the display at progressively reduced video/image resolutions. In aspects of the invention, the displayed-screen or displayed-screens having the highest priorities (e.g., the highest importance indices) are presented at full video/image resolution in a central region of the display, and the remaining displayed-screens are presented at reduced video/image resolutions in peripheral regions of the display. In embodiments of the invention, the reduced video/image resolution of a peripheral region is based on a distance from the peripheral region to the central region and/or the center of the display.

In general, video resolution is the measurement of a video's width by height in pixels. For example, a video with a 1920×1080 aspect ratio would measure 1920 pixels along the bottom and 1080 pixels in height. Although various factors (e.g., frame rate, compression processes, etc.) affect the quality of video streaming, video resolution is the most basic and most dominating parameter because it reflects the detail of the frames of the video. Resolution greatly influences the viewing experience, particularly when the video is played on large screens. The full video resolution of a given streaming video system can be the maximum resolution the display system can display based on the resolution capability of the display and its associated processing hardware and software, as well as the associated transmission network's upload speed. For example, streaming video at Full HD (high definition) at 1920×1080 pixels (1080p) to a display system that is HD-ready at 720×1080 pixels (720p) means the display system will show the Full HD video at HD-ready.

In embodiment of the invention, the WA&T protocol is dynamic in that repeated iterations of the WA&T protocol are performed. Each iteration of the WA&T protocol results in updated importance index computations; an updated highest priority displayed-screen; and an updated combination of the remaining displayed-screens. In some instances, the importance index computations, the highest priority displayed-screen, and the combination of the remaining displayed-screens are not changed from one iteration of the WA&T protocol to the next iteration of the WA&T protocol. In some instances, the importance index computations, the highest priority displayed-screen, and/or the combination of the remaining displayed-screens change from one iteration of the WA&T protocol to the next iteration of the WA&T protocol. The WA&T protocol makes changes to the wall arrangement, if necessary, to reflect the updates.

In some embodiments of the invention, the WA&T protocol makes "user-attention-based adjustments" to the wall arrangement based on user attention data that represents the portion or portions of the displayed wall arrangement that are in fact receiving attention from the user. The user attention data can be generated using, for example, user heading tracking systems, user eye tracking systems, and/or user movement systems. In embodiments of the invention, the user-attention-based adjustments can be implemented as adjustments to the resolution(s) at peripheral regions of the display. For example, user attention data can reflect that a user is paying attention to (looking at, turning his/her head toward, making movement/gestures toward) a particular peripheral region or group of peripheral regions. In response to this user attention data, the WA&T protocol can make user-attention-based adjustments that increase the reduced resolution in the particular peripheral region or group of peripheral regions that are receiving the user's attention. In some embodiments of the invention, the WA&T protocol can predict the duration that the user's attention will be directed to the particular peripheral region or group of peripheral regions. In some embodiments of the invention, the WA&T protocol discontinues the user-attention-based adjustments after the predicted duration has ended. In some embodiments of the invention, after the user-attention-based adjustments are discontinued, the WA&T protocol returns to performing the previously-described iterations of the WA&T protocol using, inter alia, importance index computations.

As noted previously, in embodiments of the invention, the above-described WA&T protocol is implemented using a wall agent module, an edge streamer module, and optionally a neural network module. In embodiments of the invention, the wall agent module is coupled to the display, the edge streamer module is coupled to a video stream transmission site, the wall agent module is coupled through a network (e.g., the Internet) to the edge streamer module, and the optional neural network module can be at any suitable location other than the wall agent module. A division of labor is implemented in which selected operations of the WA&T protocol having relatively lower computational requirements are performed by the wall agent module; and selected operations of the WA&T protocol having relatively higher computational requirements are performed by the edge streamer module and/or the neural network module.

In embodiments of the invention, the importance index computation is performed by the edge streamer module working in tandem with the wall agent module. In embodiments of the invention, the wall agent module is operable to select from a number of available functions/models a function/model operable to compute an importance index that is appropriate for the particular physical system that is being implemented in the smart multi-screen wall arrangement. For example, the physical system that is being implemented in the smart multi-screen wall arrangement system can be an SOC of video-based security system, and the selected function/model can be trained to determine whether a given video stream reflects a potential security threat. In some embodiments of the invention, the available functions/models can be created and trained at a location other than the wall agent module and/or the display. For example, the available functions/models can be created and trained at a cloud computing server and/or at the edge streaming module. In some embodiments of the invention, the available trained functions/models can be stored at the wall agent module, a cloud computing server, and/or the edge streaming module. In embodiments of the invention where the available functions/models are stored at the wall agent module, the wall agent module can select one of the available functions/models by pushing the selected function/model to the edge streamer module, and the edge streamer module uses the selected function/model to perform the importance index computations, as well as the resolution reductions based on the importance index computations. In embodiments of the invention where the available functions/models are not stored at the wall agent module, the wall agent module can select one of the available functions/models by sending a request to a resident location of the selected function/module (e.g., at a cloud computing server, or at the edge streamer module) to deploy the selected function/model.

The selected function/model can be operable to assign the highest importance to video streams that reflect the highest potential threat. Similarly, the same selected function/model can be operable to assign the lowest importance index to video streams that reflect the lowest potential threat. The edge streamer module then implements a portion of the WA&T protocol that uses the computed importance indices to determine the full resolution streams, determine the reduced resolution video screen, and the make appropriate resolution adjustments to the to-be-transmitted video stream to generate a reduced-size, to-be-transmitted video stream. The to-be-transmitted video stream is "reduced-size" in that it is less than the size required to transmit full video/image resolutions of the to-be-transmitted video stream. The edge streamer module transmits the importance index computations and the reduced resolution/size video streams to the wall agent module, which uses this information from the edge streamer module to implement the previously-described "wall arrangement" portion of the WA&T protocol that arranges the screens/monitors for display based on screen priority (i.e., the importance index computation).

In embodiments of the invention, the selected function/model can also be trained to perform the user-attention-based adjustments used in the WA&T protocol. In embodiments of the invention, the selected function/model can include a sub-function/sub-module trained to perform the user-attention-based adjustments used by the WA&T protocol. The WA&T protocol can determine when the user attention data exceeds a predetermined threshold, and, in response to the user attention data exceeding the predetermined threshold, send a user-attention-based adjustment request, the relevant user attention data (e.g., data identifying where the user's attention is directed), and the predicted duration of the user-attention-based adjustment to the edge streamer module. In some embodiments of the invention, the predicted duration of the user-attention-based adjustment request can be made at the edge streamer module using the user attention data and the selected function/model. In response to receiving the user-attention-based adjustment request and the predicted duration of the user-attention-based adjustment, the edge streamer module can use the selected function/model to make the necessary user-attention-based adjustments to the video streams and the importance index computations. The edge streamer module sends the adjusted/updated reduced-size video streams and the adjusted/updated importance index computations to the wall agent module for use in adjusting/updating the wall arrangement. In some embodiment of the invention, the adjusted/updated reduced-size video streams include predictions of the resolution changes that will be needed in response to the user attention data over the predicted duration. In some embodiments of the invention, the edge streamer module is operable to discontinue the user-attention-based adjustments after the predicted duration has ended. In some embodiments of the invention, after the user-attention-based adjustments are discontinued, the edge streamer module returns to generating the importance index computations without taking into account the user attention data.

In aspects of the invention, the various instances of reduced-size video described herein can be achieved using any suitable method. Embodiments of the invention described herein focus primarily on examples where reduced-size video is achieved through reducing video resolution. However, some embodiments of the invention can use other methods of providing reduced-size video, including, for example, reducing the video's frame rate (i.e., the number of frames per second used during video transmission).

Embodiments of the invention described herein provide technical effects and technical benefits. By employing the disclosed division of labor among the wall agent module, the edge streamer module, and optionally the neural network module when implementing the WA&T protocol, operations of the WA&T protocol having relatively lower computational requirements are assigned to the wall agent module; and operations of the WA&T protocol having relatively higher computational requirements are assigned to the edge streamer module and the neural network module. Thus, embodiments of the invention remove as a limiting factor the computing functionality that can be provided at the HMD (or the non-HMD (NHMD)) in implementing a multi-screen wall arrangement having the potential to access and control an unlimited number of screens. The use of importance index computations to create reduced resolution peripheral regions of the display and reduced data-level video stream transmissions into the HMD (or the NHMD) address the bandwidth constraints that prevent transmitting the large amount of data that would be required to present all regions of the HMD (or the NHMD) at full video resolution. Streaming data transmissions are controlled using the novel smart WA&T protocol such that the streaming data does not exceed the transmission network's bandwidth capabilities, which reduces or eliminates streaming delay and/or resolution degradation that reduce the end user's QoE. The smart WA&T protocol's ability to automatically and repeatedly configure a relatively larger high resolution central display region and relatively smaller low resolution peripheral display regions leverage the fact that, for both stand-alone displays and displays that are integrated within the HMD, only a portion of the full 360-degree video frame is displayed at one time. The user-attention-based adjustment functionality of the novel smart WA&T protocol enables the low or reduced video/image resolution in peripheral display regions to be increased automatically based on the level of attention the user pays to a given peripheral display region.

In addition to the above-described technical effects and technical benefits, embodiments of the invention address the technical hurdles that must be overcome in order to make an infinite number of monitors available inside a VR HMD. More specifically, embodiments of the invention address the technical hurdles (e.g., bandwidth limits; selecting monitors for viewing; and the limits of human vision) of replacing expensive and complicated SOCs with an HMD in a software-driven metaverse environment. In addition to saving the hardware costs of building the SOC, a metaverse SOC implementation enabled by embodiments of the invention, would save on power, space utilization, rent, and the ability to retain employees. A VR HMD in accordance with aspects of invention further enhances the experience of an SOC by incorporating 3D graphics (e.g., augmented reality), customizable dashboards, and other elements. The operators of a metaverse SOC implemented in accordance with embodiments of the invention would not need to be in the same room if they are in the same "virtual space," thus enabling them to collaborate even more effectively. The ability to virtually "travel" to various "places" in the metaverse would enable an operator to virtually visit any number of remote physical locations and interface efficiently with the systems at the remote physical locations. Other example implementations of a multi-screen metaverse environment in accordance with embodiments of the invention include information technology (IT) service monitoring and conducting software user interface (UI) question and answer (Q&A) sessions.

Turning now to a more detailed description of the aspects of the invention, FIG. 1 depicts a diagram illustrating a smart wall arrangement VR system 100 according to embodiments of the invention. In aspects of the invention, the system 100 is an immersive 360-degree video system that includes an edge streamer module 130, a wall agent module 110, and displays 148, configured and arranged as shown. In embodiments of the invention, the displays 148 can be implemented as a head mounted display (HMD) 150 or a non-HMD (NHMD) 160. The NHDM 160 can be a stand-alone flat panel display or a flat panel display integrated with another device such as a smartphone or a laptop. The HMD 150 is configured to be worn by a local user 140. Both the HMD 150 and the NHMD 160 can be in wired or wireless communication with manipulation device(s) 152 (e.g., a three-dimensional mouse, data gloves, etc.) configured to be worn by and/or otherwise controlled/used by the local user 140. The wall agent module 110 is in wired and/or wireless communication with the display(s) 148. A large number (potentially infinite number) of screens/monitors 132 are in wired or wireless communication with the edge streamer module 130, which is in wired or wireless communication through a network 136 (e.g., the Internet) to the wall agent module 110. Additionally, a cloud computing system 50 is in wired or wireless electronic communication with the smart wall arrangement VR system 100. The cloud computing system 50 can supplement, support or replace some or all of the functionality (in any combination) of the system 100. Additionally, some or all of the functionality of the system 100 can be implemented as a node of the cloud computing system 50. Additional details of cloud computing functionality that can be used in connection with aspects of the invention are depicted by the computing environment 1000 shown in FIG. 10 and described in greater detail subsequently herein.

The wall agent module 110 is configured and arranged to use streaming video/image data received from the edge streamer 130 over the network 136, along with local user behavior data and local user attribute data in input data stream 116 received from the user 140 (via display(s) 148) to generate the output data stream 118 and provide it to the display(s) 148. In embodiments of the invention, the displays 148 can be configured to support a function-API (application program interface) that allows a local users to input local user behavior data (e.g., adjust the displayed region 126 shown in FIG. 2B) to be input to the system 100 flexibly. In accordance with embodiments of the invention, the output data stream 118 includes a full 360-degree video frame 120 (shown in FIG. 2B) shown at a time denoted as TimeN. The full 360-degree video frame 120 is depicted in FIG. 2B as an equirectangular mapped 360 degree video frame where the yaw angle (−180 to +180 degrees) and the pitch angle (−90 to +90 degrees) are mapped to the x-axis and the y-axis, respectively. The full 360-degree video frame 120 can be a video recordings where a view in every direction is recorded at the same time, shot using an omni-directional camera or a collection of cameras. During playback on a normal flat display (e.g., the NHMD 160), the local user 140 has control of the viewing direction like a panorama. The full 360-degree video frame 120 can also be played on displays or projectors arranged in a sphere or some part of a sphere (not shown). The displayed region 126 (also known as the visible area or the user's viewpoint) of the full 360-degree video frame 120 can be displayed on the displays 148. In embodiments of the invention where the display 148 is incorporated within the HMD 150, immersive (i.e., 3D) views of the full 360-degree video frame 120 can be displayed to the local user 140 on a display (e.g., display 306 shown in FIG. 3) of the HMD 150, which places tiny screens and lenses close to the eyes of the local user 140 to simulate large screens. As the local user 140 performs actions like walking, head rotating (i.e., changing the point of view), data describing behavior of the local user 140 is fed through the input data stream 116 to the wall agent module 110 from the HMD 150 and/or the manipulation devices 152. The wall agent module 110 processes the information in real-time and generates appropriate feedback that is passed back to the user 140 by means of the output data stream 118.

Referring briefly to FIG. 2B, in some embodiments of the invention, the local user 140 has a personal FOV 128A that can be larger or smaller than the displayed region 126. Although some examples described herein reference the local user's FOV, it is understood that the local user's FOV and the displayed region 126 are interchangeable in those examples. In embodiments of the invention, the local user 140 can only focus on a subset of the display 126 that is within the local user's FOV 128A (shown in FIGS. 2A and 2B). Additionally, because the 360-degree video frame 120 is larger than what is shown on the displays 148 without undue compression, the location of the displayed region 126 can be adjusted by the local user 140 (e.g., using the manipulation device(s) 152) so that his/her preferred FOV 128A is within the displayed region 126 (or as large as the displayed region 126; or larger than the displayed region 126). For ease of description, the portion of the full 360-degree video frame 120 that will be displayed on the displays 148 can be referred to herein as the "FOV" or the "displayed-FOV" even though it is understood that the displayed region 126 of the full 360-degree video frame 120 can include more or less than the user's FOV 128A.

Returning to FIG. 1, the wall agent module 110, the edge streamer module 130, and (optionally) the cloud computing system 50 execute a wall arrangement protocol (e.g., methodology 600 shown in FIG. 6) in accordance with embodiments of the invention. In embodiments of the invention, the smart wall arrangement protocol includes determining a priority of each of the available screens/monitors 132; determining the total number of the screens/monitors 132 that will be on the HMD 150 (or the NHMD 160) at one time (i.e., the "displayed-screens"); and arranging the displayed-screens based on each displayed-screen's priority. Additional details of how the smart wall arrangement protocol can be implemented are described subsequently herein in connection the descriptions of the methodology 600 (shown in FIG. 6), the systems 100A (shown in FIG. 4), 100B (shown in FIG. 5), the 3D image 702 (shown in FIG. 7), and the screen wall arrangements 800A, 800B (shown in FIG. 8).

Figure 2A:
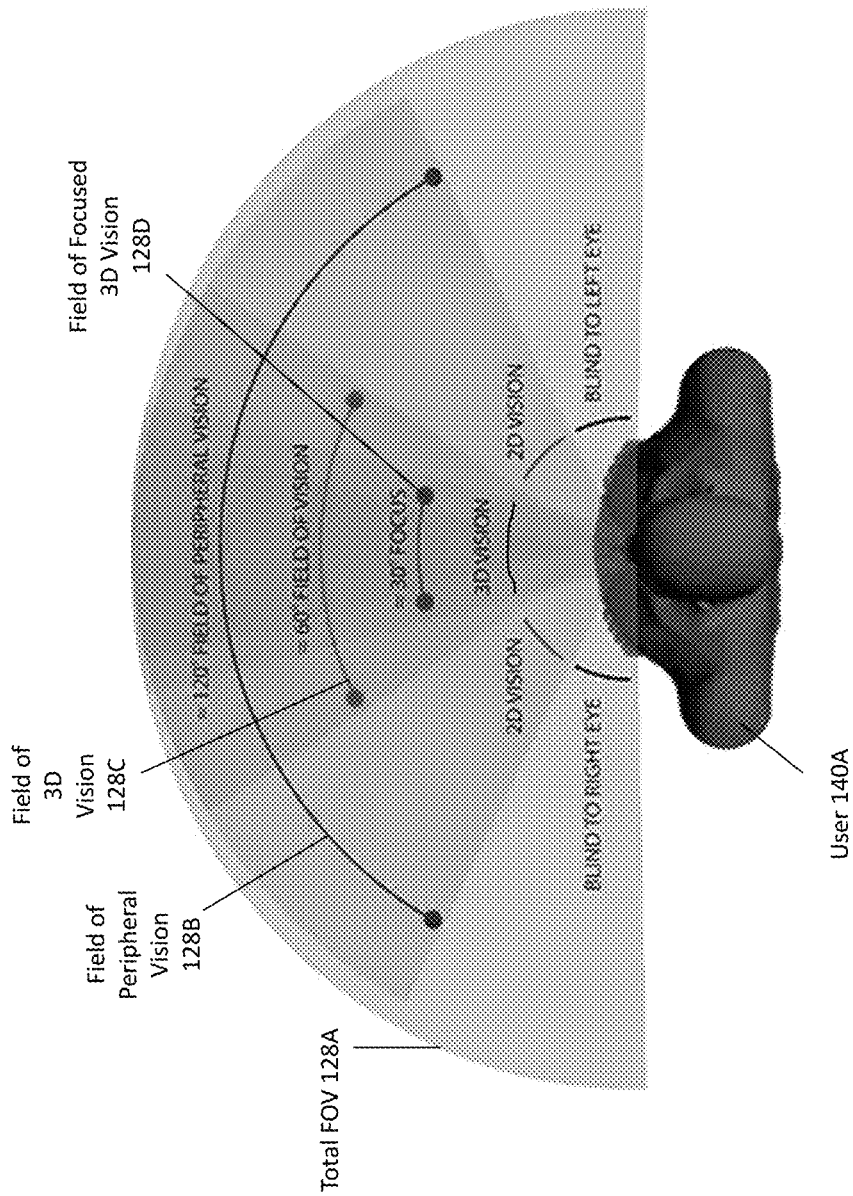
FIG. 2A depicts a top-down view of a human field-of-view (FOV) that illustrates concepts utilized in aspects of the invention.
Figure 2B:
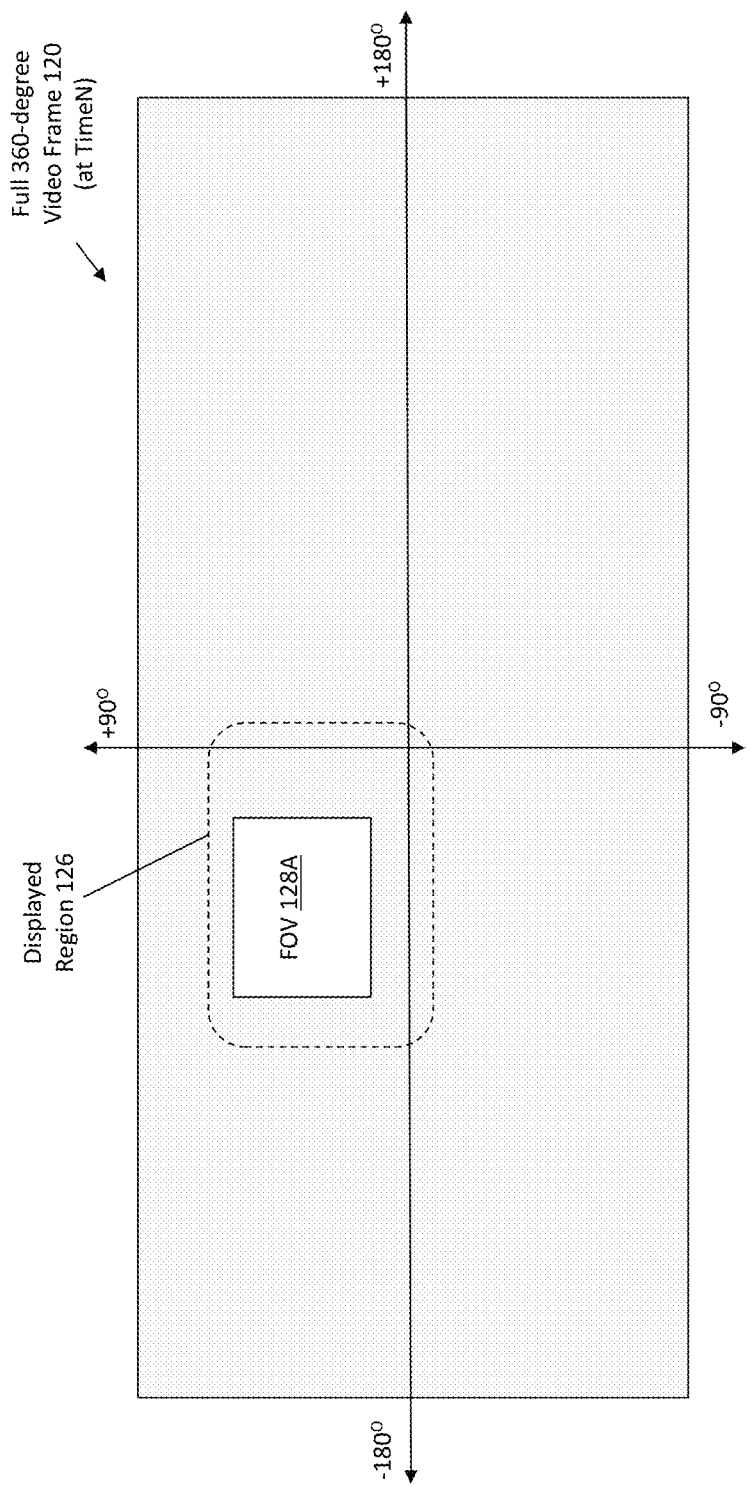
FIG. 2B depicts a block diagram illustrating additional details of a full 360-degree video frame according to embodiments of the invention.
Figure 7:
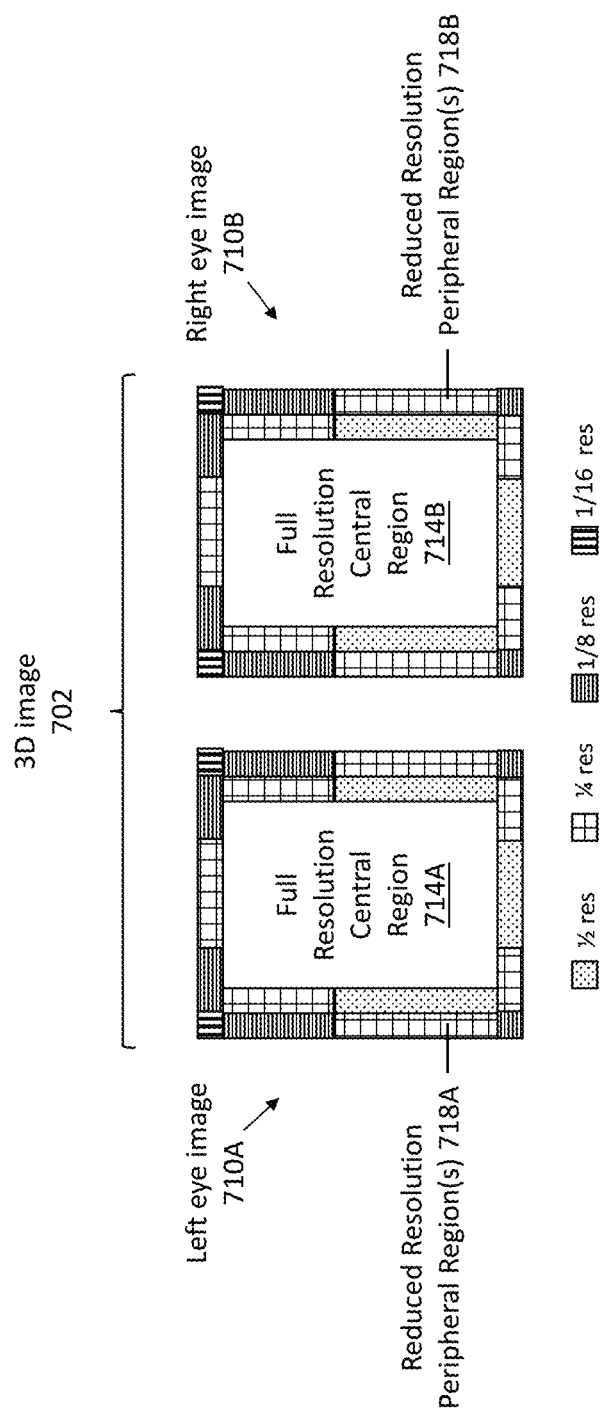
FIG. 7 depicts a block diagram illustrating a three-dimensional (3D) display screen according to embodiments of the invention.

FIG. 2A depicts a top-down view of a total FOV 128A of a user 140A that illustrates concepts utilized in aspects of the invention. The user 140A corresponds to the user 140 (shown in FIG. 1). In general, the total FOV 128A is the open observable area the user 140A can see through his or her eyes or via an optical device. A person's eyes are the natural start of perception of the total FOV 128A. The total FOV 128A is formed from multiple regions including a field of peripheral vision (FOPV) 128B; a field of 3D vision 128C; a field of focused 3D vision 128D; a leftmost field that is blind to the right eye; and a rightmost field that is blind to the left eye. In human vision, the field of 3D vision 128C is composed of two monocular FOVs, which the brain stitches together to form the field of 3D vision 128C as one binocular FOV. Examples of two monocular FOVs in accordance with aspects of the invention are shown in FIG. 7 as a left-eye image 710A and a right-eye image 710B, which are described in greater detail subsequently herein. Returning to FIG. 2A, human eyes have a horizontal FOV of about 135 degrees and a vertical FOPV 128B of just over 180 degrees. The remaining 60-70 degrees of the total FOV 128A is devoted to the leftmost field that is blind to the right eye; and a rightmost field that is blind to the left eye. These regions are only monocular vision because only one eye can see those sections of the total FOV 128A. The measurements depicted in FIG. 2A are based on the total FOV 128A during steady fixation of the eyes of the user 140A.

As best shown in FIGS. 2A, 2B, and 7, embodiments of the invention leverage the limitations of the human eye by only providing full resolution images at a central region 714A, 714B (shown in FIG. 7) of the displayed region 126 (shown in FIG. 2B) that corresponds to the field of focused 3D vision 128D (shown in FIG. 2A). FIG. 7 depicts a 3D image 702 rendered in accordance with embodiments of the invention, where the left eye monocular view of the 3D image 702 is depicted as a left eye image 710A, and where the right eye monocular view of the 3D image 702 is depicted as a right eye image 710B. The left eye image 710A includes the central region 714A surrounded by peripheral regions 718A. The right eye image 710B includes the central region 714B surrounded by peripheral regions 718B. Embodiments of the invention assign priorities to the video images (e.g., block 606 of the methodology 600 shown in FIG. 6) and place the low priority video images in the peripheral regions 718A, 718, while placing the higher priority video images in the central region B at full resolution (e.g., block 608 of the methodology 600 shown in FIG. 6), thereby aligning the 3D video image 702 with the visual focus capabilities of the user 140A. In embodiments of the invention, the reduced resolution values assigned to the peripheral regions 718A, 718B decrease progressively as the distance of the peripheral region 718A, 718B from the central region 714A, 714B increases. In accordance with aspects of the invention, the allocation of priority-based full resolution regions and reduced resolution regions allowing transmitted streaming data of the 3D image 702 to fit within the bandwidth limitations of the transmission pipe.

FIG. 2B depicts a block diagram illustrating additional details of a full 360-degree video frame 120 at TimeN in accordance with embodiments of the invention. The displayed region 126 is the portion of the 360 degree video frame 120 that is displayed on the user's display (e.g., the HMD) at a time. As TimeN advances (e.g., Time1, Time2, Time3, etc.), the displayed region 126 and the FOV 128A can move in response to user behavior data to track the portion of the video frame 120 that is being viewed by the user 140. Similarly, the user FOV 128A can move within the displayed region 126 based on the portion of the displayed region 126 where the eyes of the user 140 are directed. In embodiments of the invention, the user behavior data can include but is not limited to the FOVs being viewed by (or selected by or chosen by) the user 140; indications that the user 140 likes or does not like his/her selected/chosen FOV; the portion of the displayed region 126 where the eyes of the user 140 are looking; and/or the length of time (dwell time) that the user 140 spends on his/her selected/chosen FOV.

Figure 3:
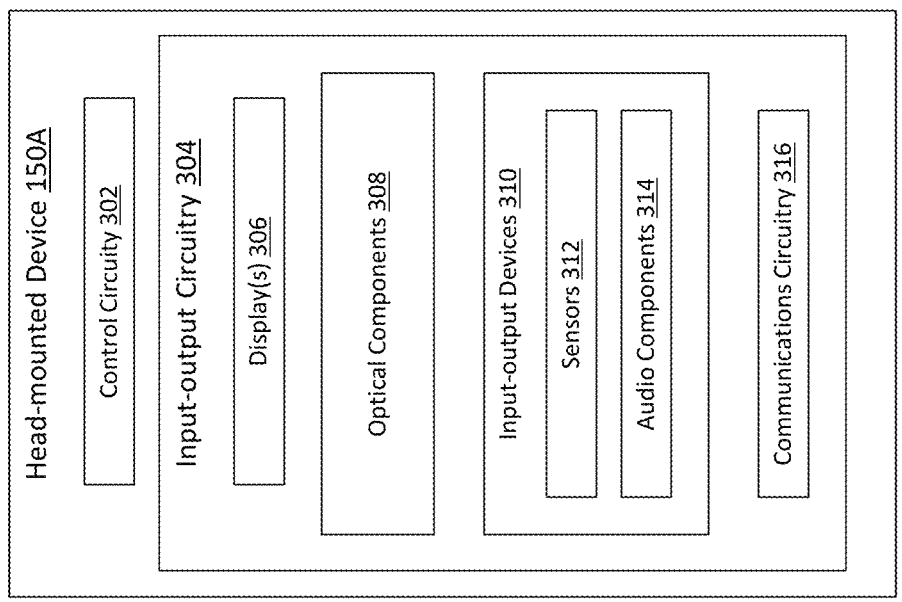
FIG. 3 depicts details of a head-mounted-device (HMD) according to embodiments of the invention.

FIG. 3 depicts an HMD 150A, which is a non-limiting example of how the HMD 150 (shown in FIG. 1) can be implemented. In accordance with aspects of the invention, the HMD 150A includes control circuitry 302 and input-output circuitry 304, configured and arranged as shown. The input-output circuitry 304 includes display(s) 306, optical components 308, input-output devices 310, and communications circuitry 318, configured and arranged as shown. The input-output devices 310 include sensors 312 and audio components 314, configured and arranged as shown. The various components of the HMD 150A can be supported by a head-mountable support structure such as a pair of glasses; a helmet; a pair of goggles; and/or other head-mountable support structure configurations.

In embodiments of the invention, the control circuitry 302 can include storage and processing circuitry for controlling the operation of the HMD 150A. The control circuitry 302 can include storage such as hard disk drive storage, non-volatile memory (e.g., electrically-programmable-read-only memory configured to form a solid state drive), volatile memory (e.g., static or dynamic random-access-memory), etc. Processing circuitry in the control circuitry 302 can be based on one or more microprocessors, microcontrollers, digital signal processors, baseband processors, power management units, audio chips, graphic processing units, application specific integrated circuits, and other integrated circuits. Computer program instructions can be stored on storage in the control circuitry 302 and run on processing circuitry in the control circuitry 302 to implement operations for HMD 150A (e.g., data gathering operations, operations involving the adjustment of components using control signals, image rendering operations to produce image content to be displayed for a user, etc.).

The input-output circuitry 304 can be used to allow the HMD 150A to receive data from external equipment (e.g., the wall agent module 110 (shown in FIG. 1); a portable device such as a handheld device; a laptop computer; or other electrical equipment) and to allow the user 140 (shown in FIG. 1) to provide the HMD 150A with user input. The input-output circuitry 304 can also be used to gather information on the environment in which HMD 150A is operating. Output components in the input-output circuitry 304 can allow the HMD 150A to provide the user 140 with output and can be used to communicate with external electrical equipment.

Display(s) 306 of the input-output circuitry 304 can be used to display images (e.g., the full 360-degree video frame 120 (shown in FIG. 2B)) to the user 140 (shown in FIG. 1) of the HMD 150A. The display(s) 306 can be configured to have pixel array(s) to generate images that are presented to the user 140 through an optical system. The optical system can, if desired, have a transparent portion through which the user 140 (viewer) can observe real-world objects while computer-generated content is overlaid on top of the real-world objects by producing computer-generated images (e.g., the full 360-degree video frame 120) on the display(s) 306. In embodiments of the invention, the display(s) 306 are immersive views of the full 360-degree video frame 120, wherein the display(s) 306 place tiny screens and lenses close to the user's eyes to simulate large screens that encompass most of the user's field of view. As the user 140 performs actions like walking, head rotating (i.e., changing the point of view), data describing behavior of the user 140 (shown in FIG. 1) is fed to the computing system 110 (shown in FIG. 1) from the HMD 150A and/or the manipulation devices 152 (shown in FIG. 1).

The optical components 308 can be used in forming the optical system that presents images to the user 140. The optical components 308 can include static components such as waveguides, static optical couplers, and fixed lenses. The optical components 308 can also include adjustable optical components such as an adjustable polarizer, tunable lenses (e.g., liquid crystal tunable lenses; tunable lenses based on electro-optic materials; tunable liquid lenses; microelectromechanical system tunable lenses; or other tunable lenses), a dynamically adjustable coupler, and other optical devices formed from electro-optical materials (e.g., lithium niobate or other materials exhibiting the electro-optic effect). The optical components 308 can be used in receiving and modifying light (images) from the display 306 and in providing images (e.g., the full 360-degree video frame 120) to the user 140 for viewing. In some embodiments of the invention, one or more of the optical components 308 can be stacked so that light passes through multiple of the components 308 in series. In embodiments of the invention, the optical components 308 can be spread out laterally (e.g., multiple displays can be arranged on a waveguide or set of waveguides using a tiled set of laterally adjacent couplers). In some embodiments of the invention, both tiling and stacking configurations are present.

The input-output devices 310 of the input-output circuitry 304 are configured to gather data and user input and for supplying the user 140 (shown in FIG. 1) with output. The input-output devices 310 can include sensors 312, audio components 314, and other components for gathering input from the user 140 and/or or the environment surrounding the HMD 150A and for providing output to the user 140. The input-output devices 310 can, for example, include keyboards; buttons; joysticks; touch sensors for trackpads and other touch sensitive input devices; cameras; light-emitting diodes; and/or other input-output components. For example, cameras or other devices in the input-output circuitry 304 can face the eyes of the user 140 and track the gaze of the user 140. The sensors 312 can include position and motion sensors, which can include, for example, compasses; gyroscopes; accelerometers and/or other devices for monitoring the location, orientation, and movement of the HDM 150A; and satellite navigation system circuitry such as Global Positioning System (GPS) circuitry for monitoring location of the user 140. The sensors 312 can further include eye-tracking functionality. Using the sensors 312, for example, the control circuitry 302 can monitor the current direction in which a user's head is oriented relative to the surrounding environment. Movements of the user's head (e.g., motion to the left and/or right to track on-screen objects and/or to view additional real-world objects) can also be monitored using the sensors 312.

In some embodiments of the invention, the sensors 312 can include ambient light sensors that measure ambient light intensity and/or ambient light color; force sensors; temperature sensors; touch sensors; capacitive proximity sensors; light-based proximity sensors; other types of proximity sensors; strain gauges; gas sensors; pressure sensors; moisture sensors; magnetic sensors; and the like. The audio components 314 can include microphones for gathering voice commands and other audio input and speakers for providing audio output (e.g., ear buds, bone conduction speakers, or other speakers for providing sound to the left and right ears of a user). In some embodiments of the invention, the input-output devices 310 can include haptic output devices (e.g., vibrating components); light-emitting diodes and other light sources; and other output components. The input-output circuitry 304 can include wired and/or wireless communications circuitry 316 that allows the HMD 150A (e.g., using the control circuitry 302) to communicate with external equipment (e.g., remote controls, joysticks, input controllers, portable electronic devices, computers, displays, and the like) and that allows signals to be conveyed between components (circuitry) at different locations in the HMD 150A.

Figure 4:
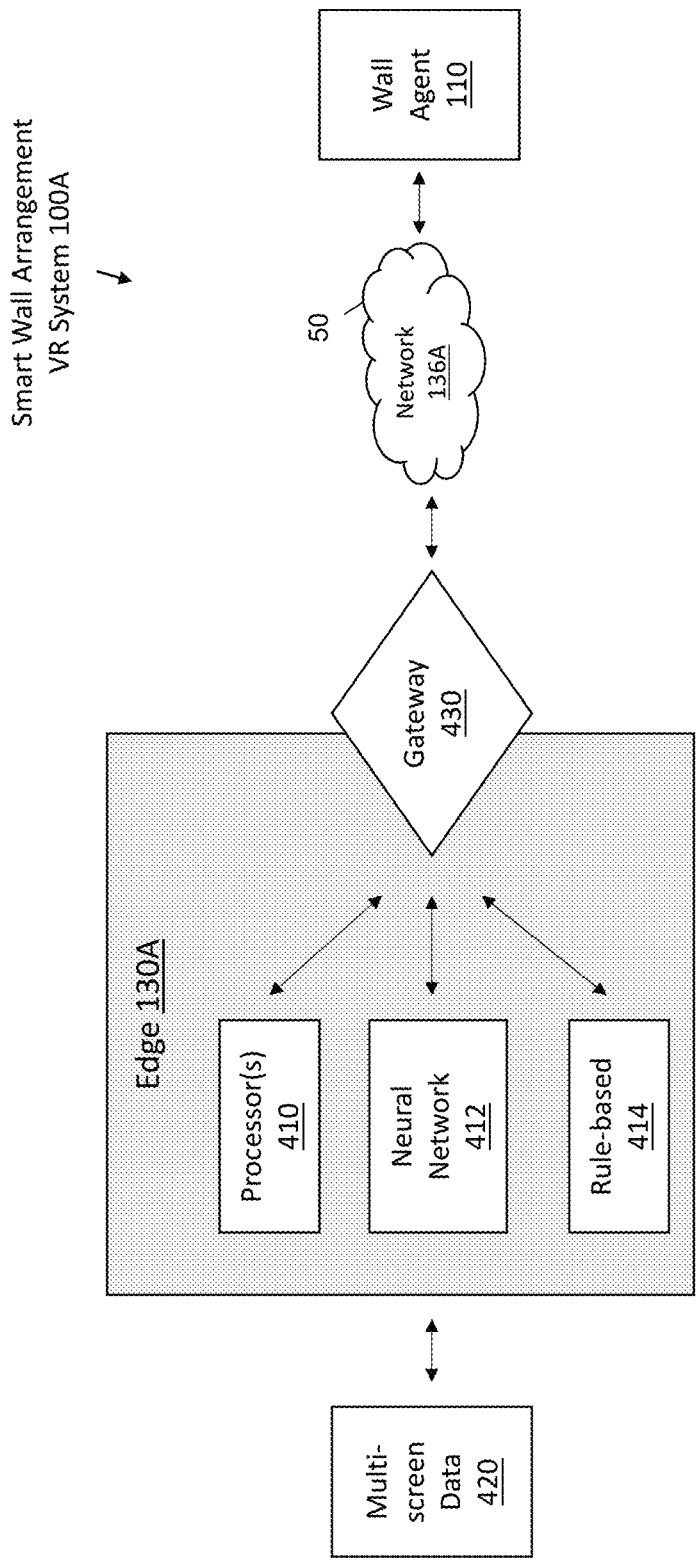
FIG. 4 depicts a block diagram illustrating additional details of a system according to embodiments of the invention.
Figure 5:
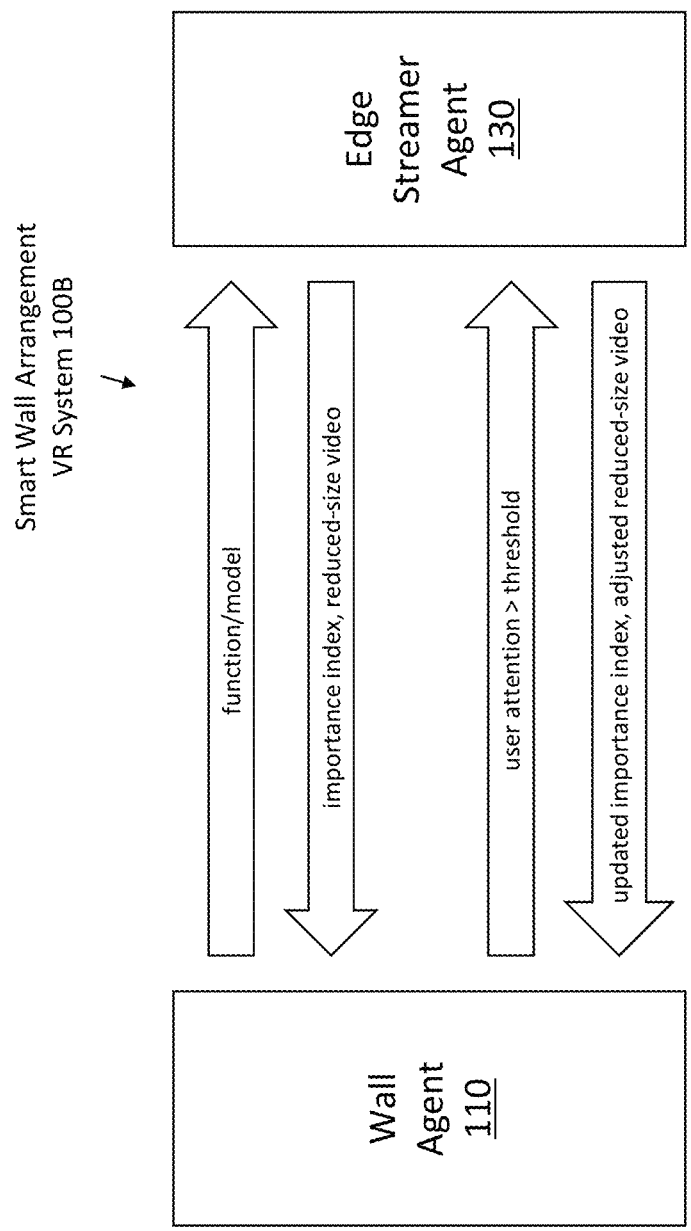
FIG. 5 depicts a block diagram illustrating additional details of a system according to embodiments of the invention.

FIG. 4 depicts a diagram illustrating a smart wall arrangement VR system 100A according to embodiments of the invention; and FIG. 5 depicts a diagram illustrating a smart wall arrangement VR system 100B according to embodiments of the invention. The video systems 100A, 100B shown in FIGS. 4 and 5 correspond to selected portions of the smart wall arrangement VR system 100 shown in FIG. 1. The systems 100A, 100B provide additional details of how an edge region 130A (which corresponds to the edge streamer module 130 shown in FIGS. 1 and 5) can be implemented, along with additional details about the interactions and operations performed by the wall agent module 110 (shown in FIG. 5) and the edge streamer module 130 (shown in FIG. 5) in accordance with embodiments of the invention. As shown in FIG. 4, the video system 100A includes an edge region 130A in communication with the wall agent module 110 through a gateway 430 and a network 136A (e.g., the Internet). The edge region 130A is formed from a processor 410, a neural network 412, a rule-based module 414, and portions of a gateway 430, configured and arranged as shown. In general, the devices that form the edge region 130A are hardware and/or software elements that control data flow at the boundary between two networks (e.g., the network (not shown) of the edge region 130A and the network 136A). The edge devices of the edge region 130A fulfill a variety of roles depending on what type of device they are, but they essentially serve as network entry or exit points. The edge devices of the edge region 130A receive multi-screen data 420 (e.g., streaming video, audio, images, text, etc.) from the screens/monitors 132 (shown in FIG. 1). As shown in FIG. 5, the video system 100B includes the wall agent module 110 and the edge streamer module 130 in communication through a network (e.g., the Internet, not shown). As shown, the wall agent module 119 is operable to push selected functions/models and/or data (e.g., user attention data) to the edge streamer module 130; and the edge streamer module 130 is operable to utilize the functions/models and/or data received from the wall agent module 110 to perform operations and return results of the operations to the wall agent 110 so the wall agent module 110 can perform operations such as a WA&T protocol (e.g., the methodology 600 shown in FIG. 6).

The operations performed by the video systems 100, 100A, 100B (shown in FIGS. 1, 4, and 5), as well as the 3D image 702 (shown in FIG. 7) and the smart wall arrangements 802A, 802B (shown in FIG. 8) will now described with reference to the methodology 600 shown in FIG. 6, and with reference to FIGS. 1, 4, 5, 7, and 8, as needed.

Figure 6:
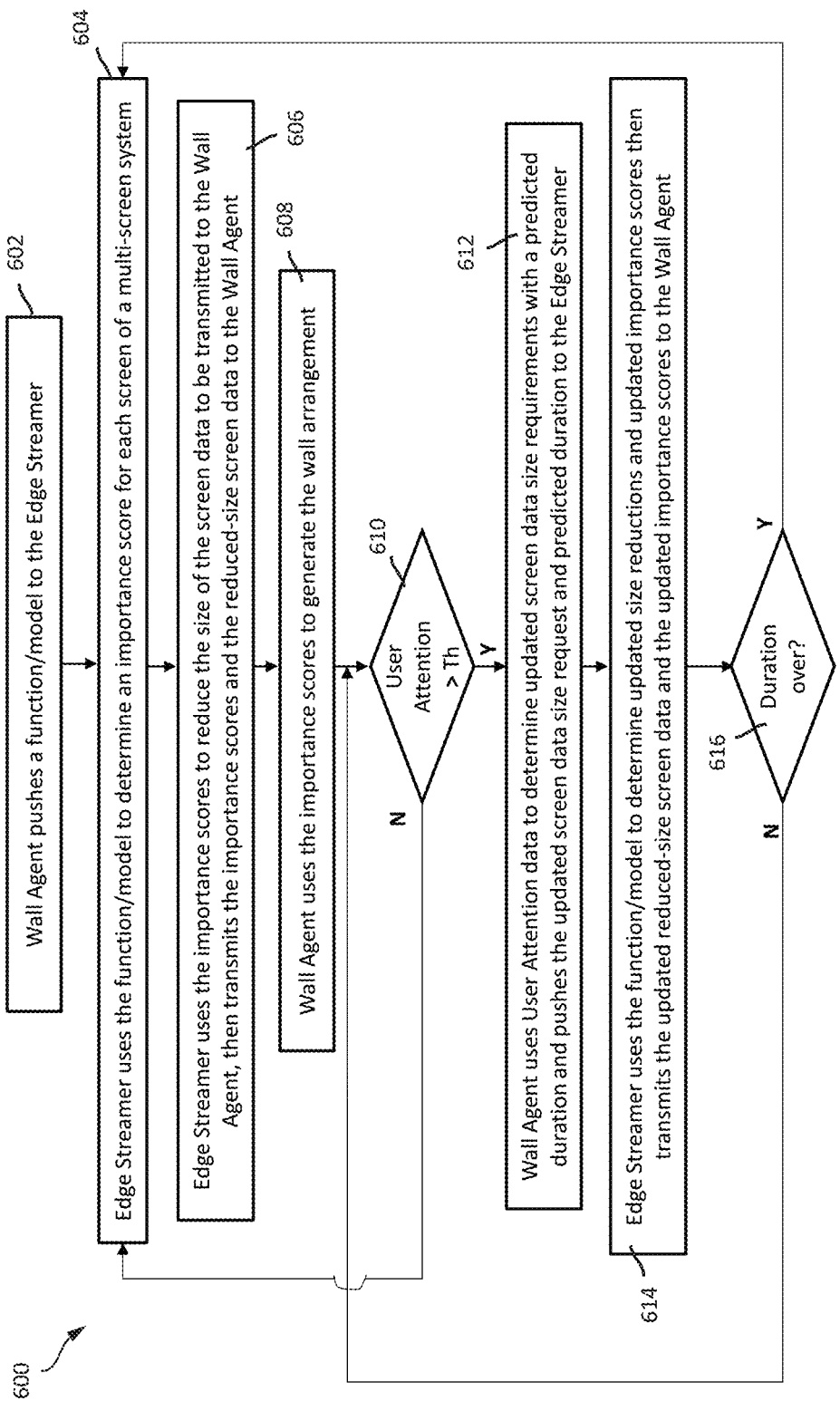
FIG. 6 depicts a flow diagram illustrating a computer-implemented methodology according to embodiments of the invention.

As shown in FIG. 6, the methodology 600 begins at block 602 by using the wall agent module 110 to push an importance function/model to the edge streamer module 130, 130A. In some embodiments of the invention, the function/ model can be a pretrained machine learning model implemented by the neural network 412 of the edge streamer module 130A. In some embodiments of the invention, the function/model can be a set of predetermined rules implemented by the rule-based module 414 of the edge streamer module 130A. In embodiments of the invention, the wall agent module 110 is operable to select from a number of available functions/models a function/model that is appropriate for the particular physical system that is being implemented in the smart wall arrangement VR system 100, 100A, 100B. At block 604, the edge streamer module 130, 130A uses the function/model to determine or assign a priority for each screen of the screens/monitors 132. In embodiments of the invention, determining or assigning a priority for score each screen of the screens/monitors 132 is accomplished by determining or assigning an importance sore for each screen of the screen/monitors 132. At block 606, the edge streamer module 130, 130A uses the importance scores to progressively reduce the resolution/size of the screen data of the screens/monitors 132 by assigning lower resolutions to screens/monitors 132 having lower importance scores, and by assigning higher resolutions to screens/monitors 132 having higher importance scores. In embodiments of the invention, the resolutions are progressively reduced as the importance scores go progressively lower in importance, thereby reducing the size of the screen data that is transmitted from the edge streamer module 130, 130A to the wall agent module 110. The importance scores, the non-reduced-resolution (and non-reduced-size) screen data, and the reduced-resolution (and reduced-size) screen data are transmitted from the edge streamer module 130, 130A to the wall agent module 110.

Figure 8:
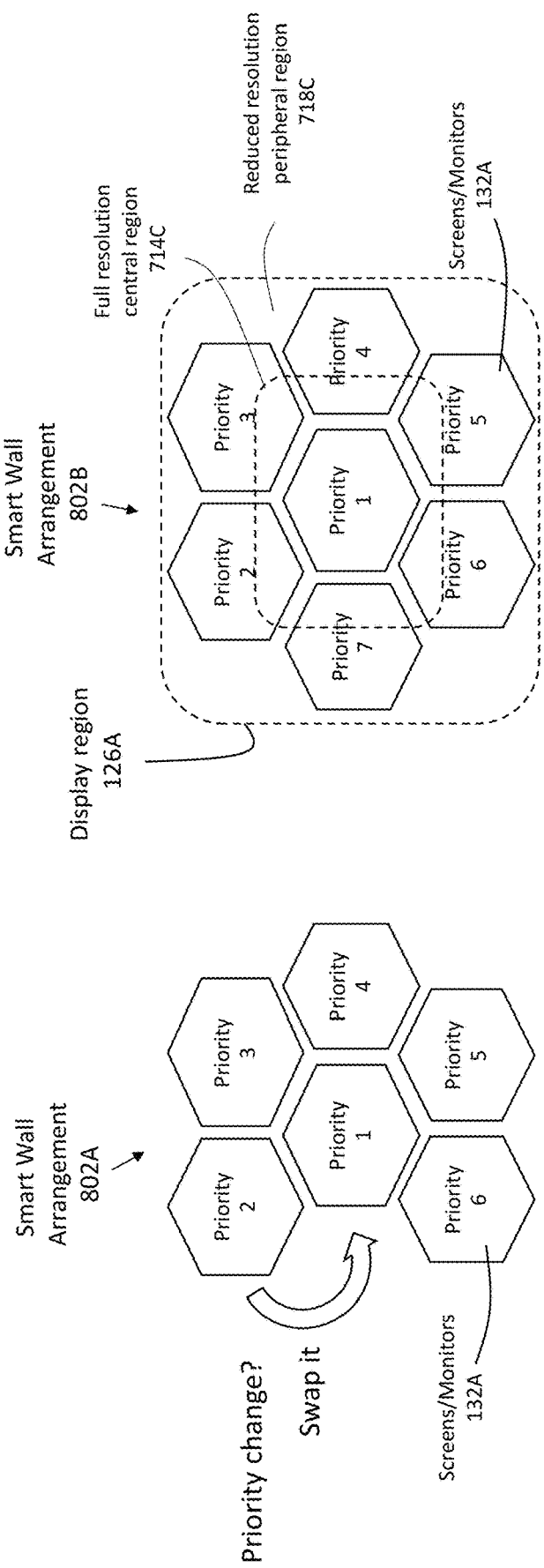
FIG. 8 depicts a block diagram illustrating features of a smart screen/monitor wall arrangement according to embodiments of the invention.

At block 608, the wall agent module 110 uses the importance scores, the non-reduced-resolution (and non-reduced-size) screen data, and the reduced-resolution (and reduced-size) screen data to generate the smart wall arrangements 800A, 800B. In FIG. 8, the smart wall arrangement 800A illustrates how the methodology 600 uses the wall agent module 110 to change the positions of the screens/monitors 132A in the smart wall arrangement 800A when the edge streamer module 130, 130A determines during a subsequent iteration of the methodology 600 that the previously-determined importance scores have changed. Additionally, the smart wall arrangement 800B illustrates how the methodology 600 uses the wall agent module 110 to arrange the screens/monitors 132A within the display region 126A, the full resolution central region 714C, and the reduced resolution peripheral region 718C. In embodiments of the invention, the operations performed at block 608 include determining the total number of screens that will be in the display region 126A at one time (i.e., the "displayed-screens"); and arranging the displayed-screens based on each displayed-screen's priority (i.e., the importance score). In embodiments of the invention, the screen/monitor 132A with the highest priority (Priority 1) is fully represented in the full resolution central region 714C, and the remaining screens 132A are represented mainly in the reduced resolution peripheral region 718C and partially in the full resolution central region 714C. In embodiments of the invention, the reduced resolution of a screen/monitor 132A in the peripheral region 718C is based on a distance from screen/monitor 132A to the central region 714C and/or the center of the display region 126A (best illustrated in FIG. 7). In the examples depicted in FIG. 8, the screens/monitors 132A are hexagonal in shape and arranged in a honeycomb wall arrangement pattern 802A, 802B. In some embodiments of the invention, the screens/monitors 132A can be provide in any suitable shape (e.g., squares, rectangles, triangles, and the like) and arranged in any suitable wall arrangement pattern that can be periodic or random.

As best shown by the small arrangement 802A, in embodiments of the invention, the methodology 600 is dynamic in that repeated iterations of the methodology 600 are performed. Each iteration of the methodology 600 results in updated importance scores; an updated highest priority screen/monitor 132A; and an updated combination of priorities of the remaining screens/monitors 132A (Priorities 2-7). If, for example, the updated importance scores indicate that the monitor/screen 132A that was previously Priority 2 is now at Priority 1, and the monitor/screen 132A that was previously Priority 1 is now at Priority 2, the positions of these screens are swapped in response to the updated importance scores.

From block 608, the methodology 600 moves to decision block 610 to determine whether the attention of the user 140, 140A has turned to a portion of the reduced resolution peripheral regions 718A, 718B, 718C. To perform the evaluation at decision block 610, the methodology 600 gathers and utilizes user attention data about the nature and extent of the FOV of the user 140, 140A using suitable eye tracking technologies configured and arranged to track eye movement and apply eye-tracking analytics that provide valuable insights into a user's attention while watching the 360-degree video frame 120 (shown in FIG. 2B), including for example what users are focused on; the details in the video that generate the biggest reaction; and what portions of the video elicit the most positive or negative user reactions. In some embodiments of the invention, a suitable eye tracking technology includes video-based eye-trackers in which a camera focuses on one or both eyes and records eye movement as the viewer looks at some kind of stimulus. An example eye-tracker uses the center of the pupil and infra-red/near-infrared non-collimated light to create corneal reflections (CR). The vector between the pupil center and the corneal reflections can be used to compute the point of regard on surface or the gaze direction. A simple calibration procedure of the individual is usually needed before using the eye tracker.

In embodiments of the invention, the decision block 610 evaluates whether the attention of the user 140, 140A on a portion of the reduced resolution peripheral regions 718A, 718B, 718C exceeds a threshold (e.g., a time threshold, a level threshold, or a combination of time and level thresholds). If the result of the inquiry at decision block 610 is no, the methodology 600 returns to block 604 to perform another iteration of blocks 604, 606, and 608. If the result of the inquiry at decision block 610 is yes, the methodology 600 moves to block 612 where the wall agent module 110 uses user attention data to determine updated screen data size requirements with a predicted duration and pushes the updated screen data size request and predicted duration to the edge streamer module 130, 130A. The updated screen data size requirements include an increase in resolution for the area of the reduced resolution peripheral region 718A, 718B, 718C where the attention of the user 140, 140 is directed. At block 614, the edge streamer module 110 uses the function/model to determine updated size reductions and updated importance scores then transmits the updated reduced-size screen data and the updated importance scores to the wall agent module 110, where the updates are used to increase the resolution of the portion of the peripheral region 718A, 718B, 718C where the attention of the user 140, 140A is directed, and to make any changes to priority-based positions of the screens/monitors 132A required by the updates generated at block 614 (e.g., the smart wall arrangement 802A shown in FIG. 8)

From block 614, the methodology 600 moves to decision block 616 to determine whether the duration determined at block 612 has ended. If the result of the inquiry at decision block 616 is no, the methodology 600 returns to decision block 610 to perform another iteration of decision block 610, block 612, block 614, and block 616. If the result of the inquiry at decision block 616 is yes, the methodology 600 returns to block 604 to perform another iteration of blocks 604, 606, and 608.

An example of machine learning techniques that can be used to implement aspects of the invention (e.g., the neural network 412 shown in FIG. 4) will be described with reference to FIGS. 9A and 9B. Machine learning models configured and arranged according to embodiments of the invention will be described with reference to FIG. 9A.

Figure 9A:
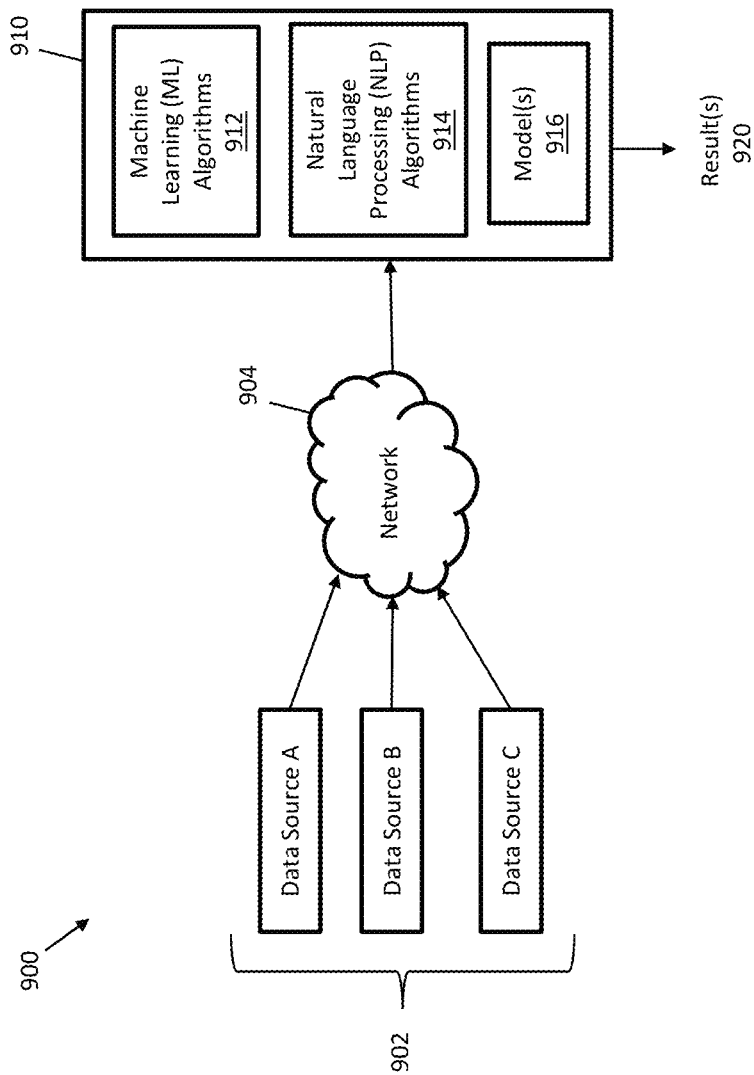
FIG. 9A depicts a machine learning system that can be utilized to implement aspects of the invention.

FIG. 9A depicts a block diagram showing a machine learning or classifier system 900 capable of implementing various aspects of the invention described herein. More specifically, the functionality of the system 900 is used in embodiments of the invention to generate various models and sub-models that can be used to implement computer functionality in embodiments of the invention. The system 900 includes multiple data sources 902 in communication through a network 904 with a classifier 910. In some aspects of the invention, the data sources 902 can bypass the network 904 and feed directly into the classifier 910. The data sources 902 provide data/information inputs that will be evaluated by the classifier 910 in accordance with embodiments of the invention. The data sources 902 also provide data/information inputs that can be used by the classifier 910 to train and/or update model(s) 916 created by the classifier 910. The data sources 902 can be implemented as a wide variety of data sources, including but not limited to, sensors configured to gather real time data, data repositories (including training data repositories), and outputs from other classifiers. The network 904 can be any type of communications network, including but not limited to local networks, wide area networks, private networks, the Internet, and the like.

The classifier 910 can be implemented as algorithms executed by a programmable computer such as a processing system 1100 (shown in FIG. 11). As shown in FIG. 9A, the classifier 910 includes a suite of machine learning (ML) algorithms 912; natural language processing (NLP) algorithms 914; and model(s) 916 that are relationship (or prediction) algorithms generated (or learned) by the ML algorithms 912. The algorithms 912, 914, 916 of the classifier 910 are depicted separately for ease of illustration and explanation. In embodiments of the invention, the functions performed by the various algorithms 912, 914, 916 of the classifier 910 can be distributed differently than shown. For example, where the classifier 910 is configured to perform an overall task having sub-tasks, the suite of ML algorithms 912 can be segmented such that a portion of the ML algorithms 912 executes each sub-task and a portion of the ML algorithms 912 executes the overall task. Additionally, in some embodiments of the invention, the NLP algorithms 914 can be integrated within the ML algorithms 912.

The NLP algorithms 914 include speech recognition functionality that allows the classifier 910, and more specifically the ML algorithms 912, to receive natural language data (text and audio) and apply elements of language processing, information retrieval, and machine learning to derive meaning from the natural language inputs and potentially take action based on the derived meaning. The NLP algorithms 914 used in accordance with aspects of the invention can also include speech synthesis functionality that allows the classifier 910 to translate the result(s) 920 into natural language (text and audio) to communicate aspects of the result(s) 920 as natural language communications.

The NLP and ML algorithms 914, 912 receive and evaluate input data (i.e., training data and data-under-analysis) from the data sources 902. The ML algorithms 912 includes functionality that is necessary to interpret and utilize the input data's format. For example, where the data sources 902 include image data, the ML algorithms 912 can include visual recognition software configured to interpret image data. The ML algorithms 912 apply machine learning techniques to received training data (e.g., data received from one or more of the data sources 902) in order to, over time, create/train/update one or more models 916 that model the overall task and the sub-tasks that the classifier 910 is designed to complete.

Figure 9B:
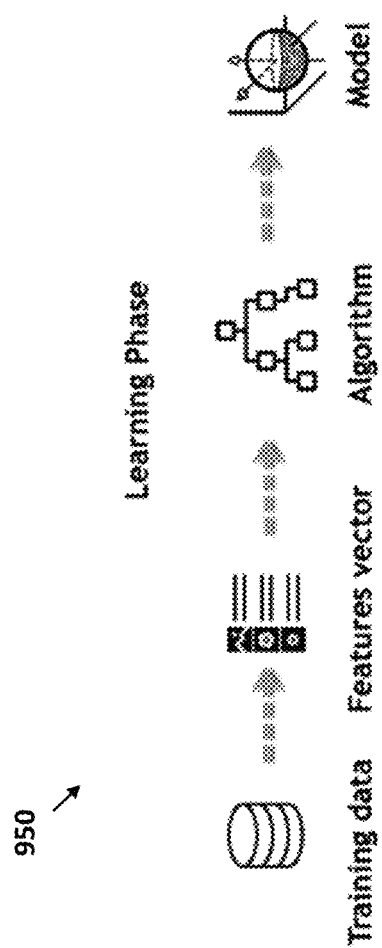
FIG. 9B depicts a learning phase that can be implemented by the machine learning system shown in FIG. 9A.

Referring now to FIGS. 9A and 9B collectively, FIG. 9B depicts an example of a learning phase 950 performed by the ML algorithms 912 to generate the above-described models 916. In the learning phase 950, the classifier 910 extracts features from the training data and coverts the features to vector representations that can be recognized and analyzed by the ML algorithms 912. The features vectors are analyzed by the ML algorithm 912 to "classify" the training data against the target model (or the model's task) and uncover relationships between and among the classified training data. Examples of suitable implementations of the ML algorithms 912 include but are not limited to neural networks, support vector machines (SVMs), logistic regression, decision trees, hidden Markov Models (HMMs), etc. The learning or training performed by the ML algorithms 912 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 910 and the ML algorithms 912. Unsupervised learning can utilize additional learning/training methods including, for example, clustering, anomaly detection, neural networks, deep learning, and the like.

When the models 916 are sufficiently trained by the ML algorithms 912, the data sources 902 that generate "real world" data are accessed, and the "real world" data is applied to the models 916 to generate usable versions of the results 920. In some embodiments of the invention, the results 920 can be fed back to the classifier 910 and used by the ML algorithms 912 as additional training data for updating and/or refining the models 916.

In aspects of the invention, the ML algorithms 912 and the models 916 can be configured to apply confidence levels (CLs) to various ones of their results/determinations (including the results 920) in order to improve the overall accuracy of the particular result/determination. When the ML algorithms 912 and/or the models 916 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 910 can be configured to apply confidence levels (CLs) to the results 920. When the classifier 910 determines that a CL in the results 920 is below a predetermined threshold (TH) (i.e., CL<TH), the results 920 can be classified as sufficiently low to justify a classification of "no confidence" in the results 920. If CL>TH, the results 920 can be classified as sufficiently high to justify a determination that the results 920 are valid. Many different predetermined TH levels can be provided such that the results 920 with CL>TH can be ranked from the highest CL>TH to the lowest CL>TH.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 10:
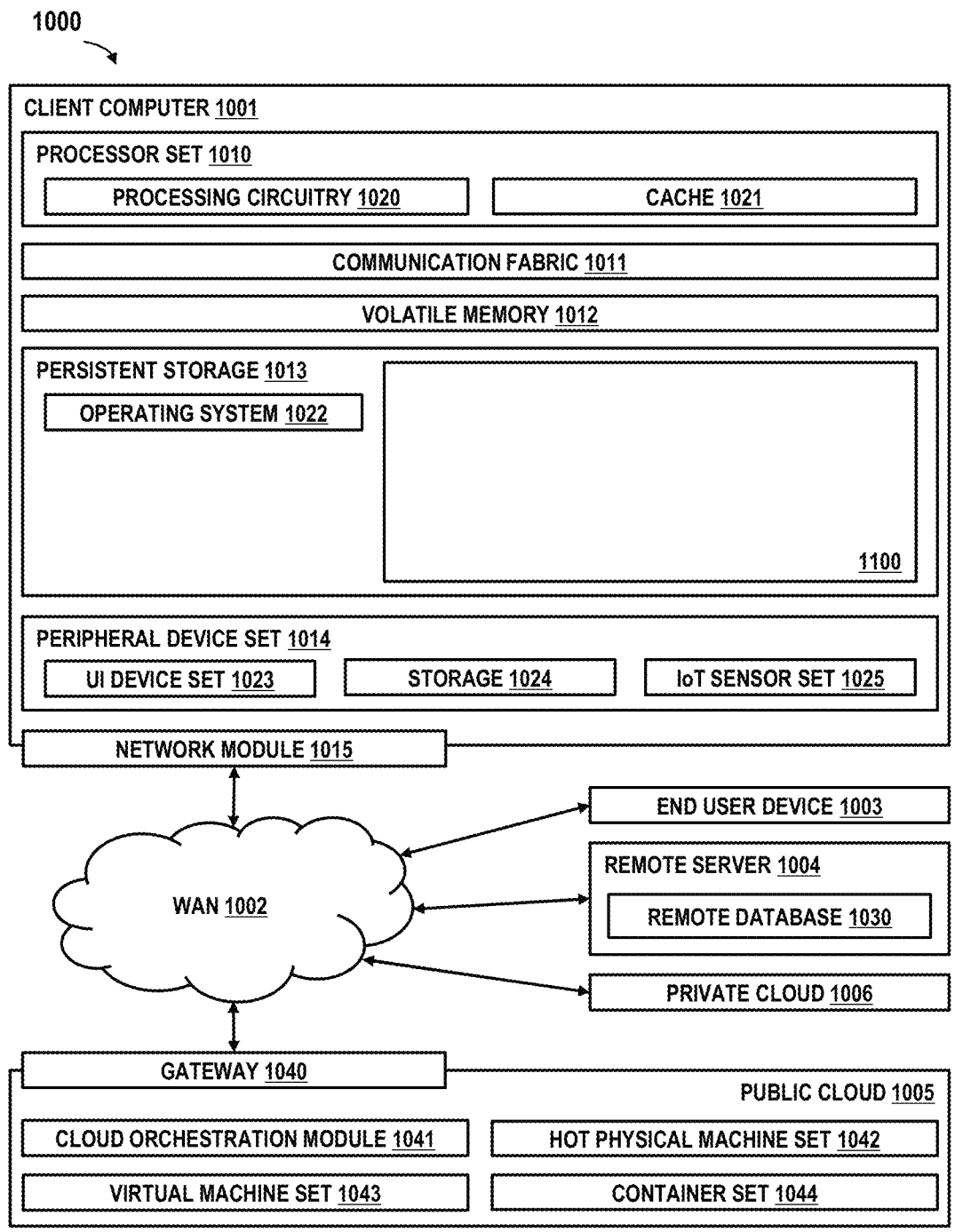
FIG. 10 depicts details of an exemplary computing environment operable to implement various aspects of the invention.

FIG. 10 depicts an example computing environment 1000 that can be used to implement aspects of the invention. Computing environment 1000 contains an example of an environment for the execution of at least some of the computer code involved in performing the inventive methods, such as a smart multi-screen (or multi-monitor) wall arrangement & transmission protocol 1100. In addition to block 1100, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1100, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1100 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1100 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in signal communication", "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of operating a multi-screen virtual reality environment, the computer-implemented method comprising:
   performing a wall arrangement and transmission (WA&T) protocol comprising:
   receiving at a second module a function transmitted by a first module over a network to the second module;
   using the second module and the function received over the network to generate priority data that identifies a priority of each of a plurality of individual video streams generated by a plurality of video sources;
   based at least in part on the priority, using the second module to generate reduced-size video streams comprising selected ones of the plurality of individual video streams;
   using the second module to transmit the priority data and a multi-screen video stream comprising:
   the reduced-size video streams; and
   non-reduced-size video streams of the plurality of individual video streams.

2. The computer-implemented method of claim 1, wherein the first module is operable to:
   responsive to receiving the priority data, generate a video screen arrangement from the multi-screen video stream; and
   display the video screen arrangement on a user display.

3. The computer-implemented method of claim 2, wherein the video screen arrangement comprises a central region of the display and peripheral regions of the display.

4. The computer-implemented method of claim 3, wherein:
   the central region is displayed at a first resolution; and
   each of the peripheral regions is displayed at a reduced resolution that is less than the first resolution and based on a distance from the central region to one of the peripheral regions associated with the reduced resolution.

5. The computer-implemented method of claim 4, wherein:
   the first module is operable to make a determination that a user is devoting user attention to a first one of the peripheral regions; and
   the WA&T protocol further comprises, based at least in part on the determination, using the second module to adjust a reduced resolution of the first one of the peripheral regions.

6. The computer-implemented method of claim 1, wherein the WA&T protocol further comprises:
   using the second module to generate updated priority data;
   based at least in part on the updated priority data, using the second module to generate updated reduced-size video streams comprising updated selected ones of the plurality of individual video streams;
   using the second module to transmit the updated priority data and an updated multi-screen video stream comprising:
   the updated reduced-size video streams; and
   updated non-reduced-size video streams of the plurality of individual video streams;
   wherein the first module is operable to, responsive to receiving the updated priority data, generate an updated video screen arrangement from the updated multi-screen video stream.

7. The computer-implemented method of claim 1, wherein:
   the function comprises a pretrained machine learning model; and
   functionality of the first module or the second module is performed at a cloud computing server.

8. A computer system comprising a processor communicatively coupled to a memory, wherein the processor performs processor operations comprising:

performing a wall arrangement and transmission (WA&T) protocol comprising:
    receiving at a second module a function transmitted by a first module over a network to the second module;
    using the second module and the function received over the network to generate priority data that identifies a priority of each of a plurality of individual video streams generated by a plurality of video sources;
    based at least in part on the priority, using the second module to generate reduced-size video streams comprising selected ones of the plurality of individual video streams;
    using the second module to transmit the priority data and a multi-screen video stream comprising:
        the reduced-size video streams; and
        non-reduced-size video streams of the plurality of individual video streams.

9. The computer system of claim 8, wherein the first module is operable to:
    responsive to receiving the priority data, generate a video screen arrangement from the multi-screen video stream; and
    display the video screen arrangement on a user display.

10. The computer system of claim 9, wherein the video screen arrangement comprises a central region of the display and peripheral regions of the display.

11. The computer system of claim 10, wherein:
    the central region is displayed at a first resolution; and
    each of the peripheral regions is displayed at a reduced resolution that is less than the first resolution and based on a distance from the central region to one of the peripheral regions associated with the reduced resolution.

12. The computer system of claim 11, wherein:
    the first module is operable to make a determination that a user is devoting user attention to a first one of the peripheral regions; and
    the WA&T protocol further comprises, based at least in part on the determination, using the second module to adjust a reduced resolution of the first one of the peripheral regions.

13. The computer system of claim 8, wherein the WA&T protocol further comprises:
    using the second module to generate updated priority data;
    based at least in part on the updated priority data, using the second module to generate updated reduced-size video streams comprising updated selected ones of the plurality of individual video streams;
    using the second module to transmit the updated priority data and an updated multi-screen video stream comprising:
        the updated reduced-size video streams; and
        updated non-reduced-size video streams of the plurality of individual video streams;
    wherein the first module is operable to, responsive to receiving the updated priority data, generate an updated video screen arrangement from the updated multi-screen video stream.

14. The computer system of claim 8, wherein:
    the function comprises a pretrained machine learning model; and
    functionality of the first module or the second module is performed at a cloud computing server.

15. A computer program product comprising a computer readable program stored on a computer readable storage medium, wherein the computer readable program, when executed on a processor system, causes the processor system to perform processor operations comprising:
    performing a wall arrangement and transmission (WA&T) protocol comprising:
        receiving at a second module a function transmitted by a first module over a network to the second module;
        using the second module and the function received over the network to generate priority data that identifies a priority of each of a plurality of individual video streams generated by a plurality of video sources;
        based at least in part on the priority, using the second module to generate reduced-size video streams comprising selected ones of the plurality of individual video streams;
        using the second module to transmit the priority data and a multi-screen video stream comprising:
            the reduced-size video streams; and
            non-reduced-size video streams of the plurality of individual video streams.

16. The computer program product of claim 15, wherein the first module is operable to:
    responsive to receiving the priority data, generate a video screen arrangement from the multi-screen video stream; and
    display the video screen arrangement on a user display.

17. The computer program product of claim 16, wherein the video screen arrangement comprises a central region of the display and peripheral regions of the display.

18. The computer program product of claim 17, wherein:
    the central region is displayed at a first resolution; and
    each of the peripheral regions is displayed at a reduced resolution that is less than the first resolution and based on a distance from the central region to one of the peripheral regions associated with the reduced resolution.

19. The computer program product of claim 18, wherein: the WA&T protocol further comprises:
    the first module is operable to make a determination that a user is devoting user attention to a first one of the peripheral regions; and
    the WA&T protocol further comprises, based at least in part on the determination, using the second module to adjust a reduced resolution of the first one of the peripheral regions.

20. The computer program product of claim 15, wherein the WA&T protocol further comprises:
    using the second module to generate updated priority data;
    based at least in part on the updated priority data, using the second module to generate updated reduced-size video streams comprising updated selected ones of the plurality of individual video streams; and
    using the second module to transmit the updated priority data and an updated multi-screen video stream comprising:
        the updated reduced-size video streams; and
        updated non-reduced-size video streams of the plurality of individual video streams;
    wherein the first module is operable to, responsive to receiving the updated priority data, generate an updated video screen arrangement from the updated multi-screen video stream.

\* \* \* \* \*